Dec. 22, 1959    W. S. DUFFIELD    2,917,950
MULTI RANGE VARIABLE SPEED TRANSMISSION
Filed Aug. 27, 1956    2 Sheets-Sheet 1

Inventor
William A. Duffield
by Stevens, Davis, Miller & Mosher
his attorneys

Dec. 22, 1959     W. S. DUFFIELD     2,917,950
MULTI RANGE VARIABLE SPEED TRANSMISSION
Filed Aug. 27, 1956     2 Sheets-Sheet 2
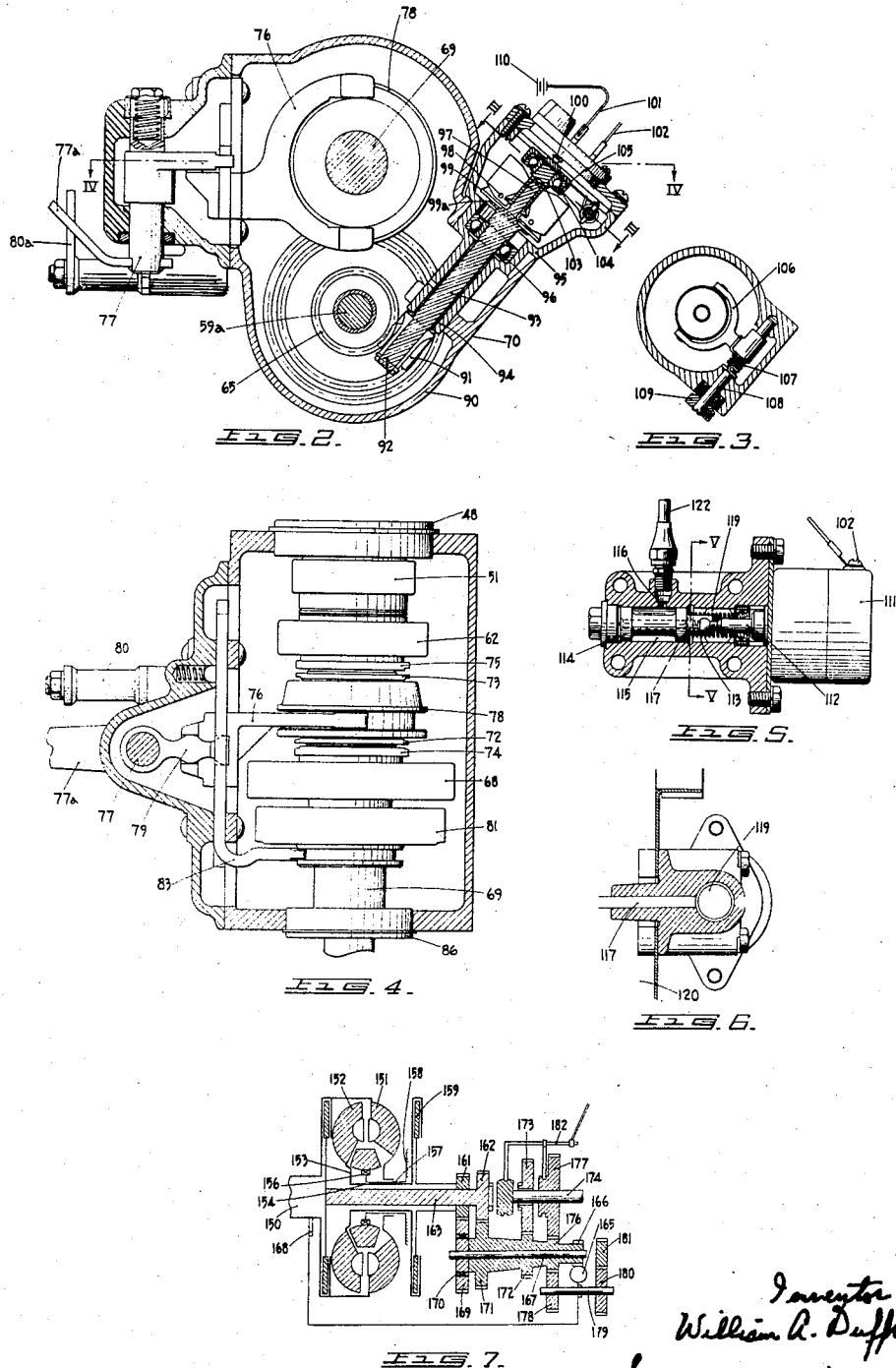

United States Patent Office 2,917,950
Patented Dec. 22, 1959

2,917,950
MULTI RANGE VARIABLE SPEED TRANSMISSION

William S. Duffield, Toronto, Ontario, Canada

Application August 27, 1956, Serial No. 606,460

Claims priority, application Canada September 2, 1955

8 Claims. (Cl. 74—730)

This invention relates to automatic variable speed transmissions of the type including a fluid drive unit and more particularly to a transmission having a plurality of ranges of operation.

The object of this invention is to provide a transmission in which the operator can select a range appropriate for the prevailing load and driving conditions and in which the speed changes of the transmission will be automatic within the selected range.

A further object of this invention is to provide a transmission having the characteristics referred to above in which the same automatic control means is used for each range of operation so as to provide a transmission which is simple and practical in construction in spite of its wide scope of operation.

The foregoing is achieved according to the preferred aspect of this invention by providing a transmission in which in each range there is a low speed during which the drive is transmitted through a torque converter to an input pinion and from thence through a one way brake to a countershaft gear, and then from the countershaft to the tail shaft, an intermediate speed range in which the torque converter acts as a fluid coupling and a high speed at which a clutch is engaged by the operation of a governor responsive to the speed of the countershaft. The clutch couples the input shaft to a second input pinion. One range is provided for by providing gearing coupling the countershaft to the tail shaft, a second higher range is provided for by coupling the second input pinion directly to the tail shaft. A synchronizer or equivalent selection means is provided to couple the tail shaft to the second input pinion or to a gear of said gearing to enable the appropriate range to be selected. During each range the governor, due to its being controlled by the countershaft, and the torque converter provide, without the necessity of adjustment, a range of automatic operation.

Preferably a reverse system is provided which can conveniently be achieved by providing a reverse gearing engagable to couple the countershaft to the tail shaft. This provides three speeds in reverse.

In accordance with one embodiment of the invention a third forward range is provided using a sliding gear mounted on the tail shaft and forming part of the reverse gearing. A position is provided for this sliding gear in engagement with a gear on the countershaft. This provides a third range having low intermediate and high speeds similar to that of the first and second ranges and utilizing the same torque converter and governor.

The construction of a transmission in accordance with this invention and the nature and scope of this invention will be further apparent from the description which follows of the preferred embodiments of the invention and from the appended claims.

In the drawings

Figure 2 is a sectional view on the line II—II of Figure 1.

Figure 3 is a sectional view on the line III—III of Figure 2.

Figure 4 is a sectional view on the line IV—IV of Figure 2.

Figure 5 is a sectional view of the mechanism for controlling the admission of hydraulic fluid to clutch 63 in Figure 1 through tube 122.

Figure 6 is a sectional view on the line V—V of Figure 4.

Figure 7 is a diagrammatic view of a further embodiment of the invention.

Figure 1:
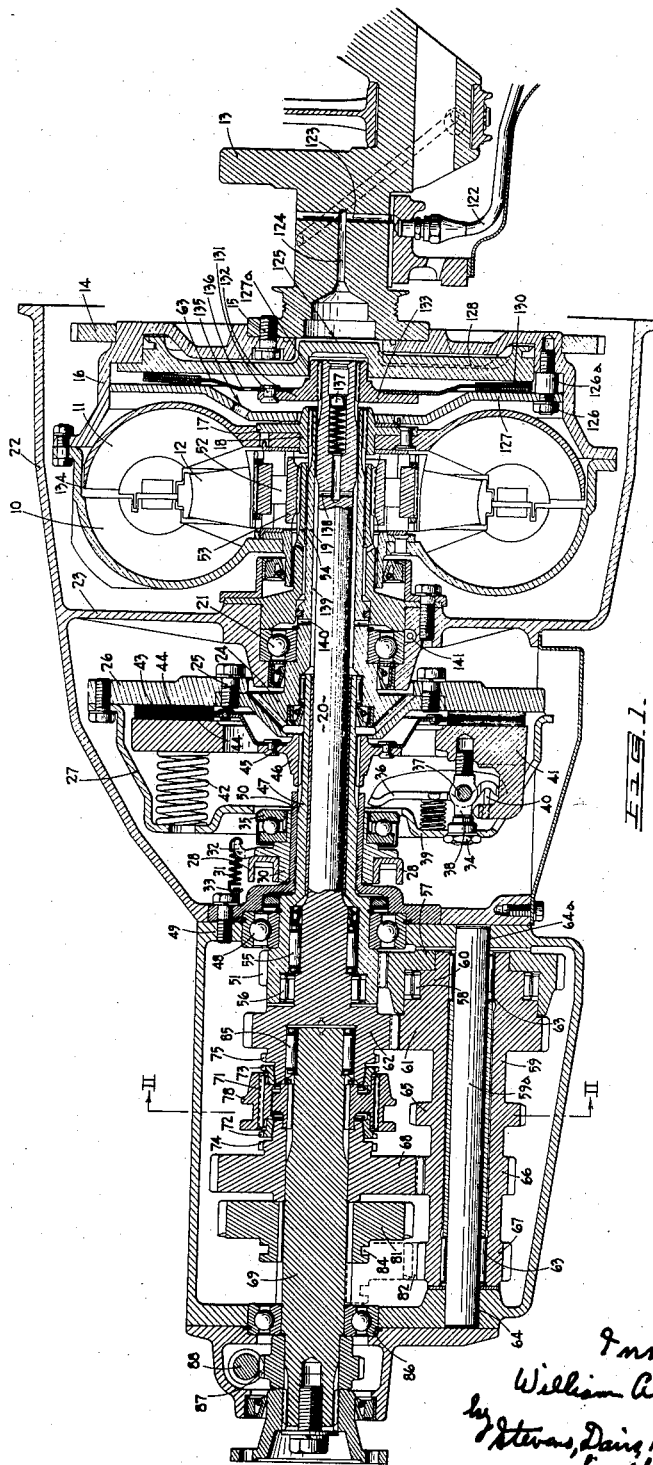
Figure 1 is an elevation sectional view of one embodiment of the invention.

Reference will now be made to the embodiment illustrated in Figures 1 to 5. Figure 1 shows a fluid torque converter of the converter-fluid coupling type comprising an impeller 10, a turbine or runner 11 driven by the impeller and reaction member 12. The torque converter functions as such as long as the runner turns at a comparatively slow speed. When the runner has attained the speed at which output torque drops below the input torque, torque conversion ceases and the unit starts to function as a fluid coupling. The drive to impeller 10 passes from engine crank shaft 13 which is the input member of the transmission, through flywheel 14, which is joined to crank shaft 13 by bolts 15 and through converter casing 16. Runner 11 is mounted on flange 17 of splined hub 18. Hub 18 is splined to sleeve 19 which encircles the main drive shaft 20 of the transmission. Sleeve 19 is carried by bearing 21 which is mounted in the main casing of the transmission 22 by web 23. A flange 24 forming part of sleeve 19 is joined by bolts 25 to the back plate 26 of a release clutch indicated generally by the numeral 27 and which is illustrated as being a conventional dry single plate mechanically operated clutch. Other types of clutch may be substituted and the clutch can be operated mechanically, hydraulically, by vacuum or any other suitable means.

The release clutch illustrated comprises a release fork 28 which is biased to the right with respect to Figure 1 to disengage the clutch. This moves sleeve 30 to the right against the influence of tension spring 31 connected between spur 32 on sleeve 30 and hook 33 on casing 22. The movement of sleeve 30 transmits thrust to release levers 36 through thrust bearing 35 and levers 36. Levers 36 are pivotally mounted by pins 37 on adjustment yokes 38 which are mounted in cover plate 39 by adjustment screw 34 which controls the positions of pivot pins 37. Links 40 connect the outer ends of release levers 36 to pressure plate 41. Accordingly, clockwise rotation of levers 36 causes pressure plate 41 to be withdrawn against the pressure of compression springs 42 to free clutch disc 43. Clutch disc 43 has friction elements 44 on each surface and is joined by rivets 45 to flanged hub 46 which is splined to sleeve shaft 47. Sleeve shaft 47 is mounted in bearing 48; this bearing is carried by web 49. Sleeve 50 is joined to casing 22 and is interposed between sleeve 30 and sleeve shaft 47. When release clutch 27 is engaged, the drive from the runner 11 of the torque converter will be transmitted through sleeve shaft 47 to input pinion 51 of the reduction gearing system.

Reaction member 12 is carried by one way brake 52 on hub 53 which is splined to a short sleeve 54. One way brakes 52 prevent reaction member 12 from rotating backwards but permit forward rotation of the reaction member when torque conversion ceases, to permit the unit to function as a fluid coupling. The reaction of member 12 is absorbed in the casing 22 of the transmission through sleeve 54 and web 23. Considering now the reduction gearing system input pinion 51 is mounted on sleeve shaft 47 which in turn is mounted on main shaft 20 by bearing 55. Shaft 47 is coupled to main shaft 20 by one way clutch 56. One way clutch 56 prevents free wheeling of the vehicle when the hydraulically actuated clutch is disengaged. Input pinion 51 meshes with gear 57 which is coupled to countershaft 59 through one way clutch 58 mounted on an extension sleeve 60 of gear 61. A second input pinion 62 is formed on mainshaft 20 and meshes with gear 61. Hence the input to countershaft 59 can be transmitted from the torque converter through pinion 51 or directly from crank shaft 13 through the hydraulically actuated clutch indicated generally at 63 and input pinion 62. In the latter case, when hydraulically actuated clutch 63 is engaged one way clutch 58 permits the countershaft to overrun gear 57.

Countershaft 59 is mounted on spindle 59a by roller bearings 63. Countershaft spindle 59a is secured to the casing at 64 and 64a. The countershaft includes in addition to gear 61 a spiral gear 65 to drive the governor 70, which will be referred to below, a gear 66 and a gear 67. Gear 66 meshes with a gear 68 which is mounted for free rotation on tail shaft 69. A synchronizer unit 71 is splined to tail shaft 69 and has synchronizer cones 72 and 73 adapted to engage either dog clutch teeth 74 on gear 68 or dog clutch teeth 75 on pinion 62. The movement of the synchronizer unit is controlled by shifter fork 76 which engages collar 78 of the synchronizer unit. Shifter fork 76 is moved along shifter rail 80 by control lever 77a which rotates control shaft 77 to bias connecting link 79.

Reverse is provided by sliding gear 81 which is splined to tail shaft 69 and which meshes with gear 82. Gear 82 in turn engages countershaft gear 67. The engagement of the reverse gear is controlled by shifter fork 83 the position of which is determined by control shaft 80 and lever 80a and which engages collar 84 of sliding gear 81.

Tail shaft 69 is mounted in bearing 85 which receives the tail shaft within the end of main shaft 20 and rear bearing 86. The tail shaft can also be provided with a spiral gear 87 to drive the shaft 88 controlling the speedometer and mileage indicator. (not shown).

The speed responsive governor 70 is shown best in Figure 2. Governor 70 is mounted so as to be driven by spiral gear 65 of the countershaft and is adapted to control the engagement and disengagement of hydraulically actuated clutch 63.

The centrifugal speed responsive governor 70 comprises portion 90 of the transmission casing surrounding countershaft 59, gear wheel 65 forming part of shaft 59 and driving governor input gear wheel 91 which is mounted on shaft 92. Shaft 92 has an enlarged portion 93 journalled within ball bearing 96 and a cylindrically shaped portion 94 of governor housing 95. Shaft 92 also has a reduced portion 97 telescopingly engaging sleeve 103. Sleeve 103 has a flange 95 engaging slots 96 in governor weights 97. Governor weights 97 are eccentrically mounted by pins 98 on carrier plates 99 which are welded at 99a to shaft 92. Outward swinging movement of weights 97 under the influence of centrifugal force causes sleeve 103 to move outwardly with respect to portion 97 of shaft 92 to cause an electrical connection to be made between a cup 105 on rod 97 and contact 100 thus completing an electrical circuit between lines 101 and 102. Sleeve 103 carries ball bearing 104 upon which is mounted cup 105. Cup 105 is engaged by yoke 106 and is urged in the direction of rod 97 by torsion spring 107. Torsion spring 107 is on adjustment shaft 108 which has an adjustment knob 109 to control the force exerted by spring 107. Hence spring 107 opposes the outward telescoping movement of sleeve 103 to determine the countershaft speed at which the governor will act. The completion of an electrical circuit from battery 110 through lines 101 and 102 energizes solenoid 111.

The energization of solenoid 111, as shown in Figures 4 and 5, causes rod 112 to be retracted against the influence of spring 113. This movement of rod 112 moves the piston 114 of piston valve 115 to permit oil to flow from passage 116 to passage 117.

When solenoid 106 is de-energized piston 114 will be released to permit oil to flow both from passage 117 through passage 110 into engine oil sump 120. Oil for the operation of clutch 63 is taken at full engine oil pressure from engine oil gallery 121 by pipe 122, through passage 123 and pasage 124, axially bored in crankshaft 13, to clutch cylinder 125. Studs 126 fitted with spacers 126a secure back plate 127 of the clutch to the flywheel 14. There is a clearance at 127a between back plate 127 and hub 133 so that back plate 127 rotates freely with respect to hub 133. Pressure plate 128 engages clutch disc 130 when oil is supplied to clutch cylinder 125. Clutch disc 130 is mounted by rivets 131 on a flange 132 of a hub 133 which is splined to main transmission shaft 20. Thus engagement of clutch 63 causes the input to be transmitted by a direct mechanical route from shaft 13 to shaft 20.

Excess oil pressure from the torque converter is released at 134 and passes outside the runner casing, through passage 135 and 136 to exert a back pressure on clutch piston or pressure plate 128 to restore clutch cylinder 125 to a disengaged position when the full oil pressure in clutch cylinder or chamber 125 is released. The pressure of the converter oil is controlled by ball valve 137. Excess oil released by valve 137 passes through ports 138 to gallery 139, through ports 140 to lubricate bearing 21, and from thence to drain 141 which leads to the crank case.

The transmission shown in Figures 1 to 5 inclusive has two ranges of operation, each range including three speeds, and has also a reverse position, including 3 speeds and a neutral position.

NEUTRAL POSITION

When the transmission is in neutral position release clutch 27 and hydraulically actuated clutch 63 are both disengaged with the consequence that power is transmitted from input member 13 to tail shaft 69 neither through the torque converter nor by a mechanical route.

LOW RANGE

For the low speed of the low range, clutch 27 is engaged and clutch 63 is disengaged. Synchronizer 71 is positioned in engagement with the dog teeth 74 of gear 68. Power is accordingly transmitted from input member 13 through casing 16 to impeller 10. Impeller 10 drives runner 11 with member 12 acting as a reaction member. The drive passes along sleeve shaft 19, through clutch 27 to input pinion 51 and from thence to the countershaft 59 through gear 57 and one way clutch 58. The drive is then transmitted from the countershaft to the tail shaft 69 by gears 68 and 66. As the engine and converter speed increase reaction member 12 runs forward so that the converter acts as a fluid coupling to provide the intermediate speed of the low range. There is a continuous change of converter ratio between the low and intermediate speeds. When there is a further increase in the speed of countershaft 59 governor 70 acts to engage hydraulically actuated clutch 63 providing a high speed for the low range. During this high speed the drive passes directly from input member 13 through clutch 63 to main shaft 20 and from thence to pinion 62 which drives countershaft 59 through gear 61. Gear 61 is permitted by one way clutch 58 to overrun gear 57. The drive is then transmitted through gears 66 and 68 to tail shaft 69.

HIGH RANGE

The high range is engaged by positioning synchronizer 71 in engagement with dog teeth 75 of input pinion 62. During the low speed of the high range the drive is transmitted through the torque converter to input pinion 51 in the same manner as in the low range and the drive similarly is transmitted from pinion 51 to countershaft 59 through gear 57 and one way clutch 58. However in the case of the low speed of the high range the drive passes from countershaft 59 to tail shaft 69 through gears 61 and 62. As the engine speed increases there is a continuous change in converter ratio until at the intermediate speed of the high range the converter is acting as a coupling. A further increase in speed causes governor 70 to act to engage clutch 63 for the high speed of the high range. The drive then passes from input member 13 through clutch 63 and main shaft 20 directly to tail shaft 69 which is coupled to main shaft 20 by synchronizer 71. It will be noted that due to the location of the governor on the countershaft the same governor can be used without adjustment to control the change over from intermediate to high speed both for the low range and the high range. This is because during low range operation the drive passes to the countershaft through pinion 51 and gear 57 which have a higher reduction ratio than pinion 62 and gear 63 which transmit the drive to the countershaft during high range operation. Accordingly the countershaft speed at which the governor operates is the same in each instance although the reduction ratios at which the governor operates are different.

REVERSE

For reverse, clutch 27 is engaged to transmit the drive from input member 13 through the converter to input pinion 51. Gear 57 transmits the drive from input pinion 51 through one way clutch 58 to countershaft 59. Tail shaft 69 is driven in reverse from the countershaft by gear 67 which meshes with gear 82 which in turn meshes with sliding gear 81. Three speeds are provided in reverse namely low speed in which there is hydraulic torque conversion, intermediate speed in which the converter acts as a fluid coupling and high speed at which governor 70 acts to engage clutch 63 with the consequence that the drive to the counter shaft 59 passes through shaft 20, pinion 62 and gear 61.

Figure 7 illustrates an alternative embodiment of this invention which differs from the embodiment shown in Figures 1 to 5 inclusive in that a third range if provided by coupling the sliding gear mounted on the tail shaft for use in reverse to a gear mounted on the countershaft. Referring now to Figure 6, input shaft 150 drives the impeller 151 of the torque converter. Runner 152 of the torque converter is connected by flange 153 to sleeve shaft 154. Reaction member 155 is mounted through one way brake 156 on sleeve 157 which is connected to web 158 of the static casing of the transmission. Clutch 159 couples shaft 154 to sleeve shaft 160 upon which input pinion 161 is mounted. A second input pinion 162 is mounted on main shaft 163 which can be coupled by hydraulically actuated clutch 164 to input member 150. Governor 165 acts on gear 166 mounted on countershaft 167 to control the admission of oil through inlet 168 to clutch 164. Countershaft 167 has gear 169 mounted by one way brake 170 and meshing with pinion 161 and gear 171 meshing with gear 162. Countershaft 167 also includes gear 172 meshing with gear 173 which is rotatably mounted on tail shaft 174. Synchronizer 175 can be engaged with pinion 161 or with gear 173 or can be positioned in a neutral position as shown. In the foregoing respects the embodiment of Figure 6 is similar to that shown in greater detail in Figures 1 to 5. Countershaft 167 also has a gear 176 which engages a sliding gear 177 splined to tail shaft 174 at one position of sliding gear 177 to provide a third range. Gear 176 also meshes with gear 178 which is mounted on shaft 179. Shaft 179 carries a gear 180 which meshes with a pinion 181 which at another position of sliding gear 176 is engaged by the sliding gear to cause tail shaft 174 to rotate in a reverse direction. Sliding gear 176 also has a neutral position between its positions in engagement with gears 176 and 181. Suitable forks and a control lever are provided as indicated at 182 to control the engagement of synchronizer 175 and the position of sliding gear 177.

The structure shown in Figure 7 has a low and high range and a reverse operating the same as the embodiment of Figures 1 to 5 and also has an extra low range provided for by the engagement of sliding gear 177 with gear 176. During this extra low range three speeds are provided for, including, low and intermediate speeds when the converter is acting as a converter and a fluid coupling respectively and the drive is transmitted from input member 150 through the converter and clutch 159 to input pinion 161 and from thence through gear 169, one way brake 170, countershaft 167, gear 176 and gear 177 to tail shaft 174. When governor 165 operates to engage clutch 164 for the high speed of the extra low range the drive passes from input member 150 through clutch 164 and main shaft 163 to pinion 162 and from thence through gear 171, countershaft 167, gear 176 and gear 177 to tail shaft 174.

Preferably the ranges provided by a transmission of this invention overlap so that an appropriate range can be selected having regard to road and load conditions. Once the desired range has been selected, the speeds within that range will provide a reasonably wide set of ratios which will select themselves automatically backwards and forwards as required.

The following table shows a suitable set of ranges and speeds for the construction shown in Figure 7. The construction shown in Figures 1 to 5 will be similar except that the extra low range will be eliminated, if desired, ratios can be selected for the low range which are intermediate between the figures for the low range and extra low range given below.

*Table I*

| Range | Speed | Trans Gear ratio | Converter ratio | Overall ratio |
| --- | --- | --- | --- | --- |
| Extra low | low | 7.57 to 1 | 2.1 to 1 | 15.9 to 1 (stall). |
|  | intermediate | 7.57 to 1 | 1 to 1 | 7.57 to 1. |
|  | high | 5.00 to 1 |  | 5.00 to 1. |
| Low | low | 3.37 to 1 | 2.1 to 1 | 7.07 to 1 (stall). |
|  | intermediate | 3.37 to 1 | 1 to 1 | 3.37 to 1. |
|  | high | 2.22 to 1 |  | 2.22 to 1. |
| High | low | 1.51 to 1 | 2.1 to 1 | 3.17 to 1 (stall). |
|  | intermediate | 1.51 to 1 | 1 to 1 | 1.15 to 1. |
|  | high | 1 to 1 |  | 1 to 1. |
| Reverse | low | 6.12 to 1 | 2.1 to 1 | 12.85 to 1 (stall). |
|  | intermediate | 6.12 to 1 | 1 to 1 | 6.12 to 1. |
|  | high | 4.04 to 1 |  | 4.04 to 1. |

I claim:

1. A hydraulic transmission comprising an input shaft, a tail shaft, a torque converter, a countershaft, means providing an automatic change of conversion ratio between said input shaft and said countershaft, said means providing an automatic change of conversion ratio including connecting means coupling said input member to the torque converter and said torque converter to the countershaft, including additional means overrunning said connecting means engageable to couple the input member to the countershaft, means for engaging said additional means operably connected to said additional means and also including governing means driven by said countershaft and operably connected to control said means for engaging said additional means, a plurality of engageable coupling means between said countershaft and said tail shaft and means for selecting between said engageable coupling means to provide a plurality of ranges for said change of conversion ratio.

2. A hydraulic transmission as in claim 1 in which one of said engageable coupling means between said countershaft and said tail shaft is provided by said additional means, overrunning said connecting means engageable to couple the input member to the countershaft.

3. A hydraulic transmission comprising an input shaft, a tail shaft, a torque converter, a countershaft, coupling means engageable drivably to connect said input shaft to said countershaft through the torque converter, additional coupling means engageable drivably to connect said input shaft to said countershaft, means for engaging said additional coupling means operably connected to said additional coupling means, means enabling the countershaft to overrun said coupling means during engagement of said additional coupling means, governing means controlled by the speed of rotation of said countershaft operably connected to control said means for engaging said additional coupling means to cause engagement of said additional coupling means with the input shaft at a predetermined speed of said countershaft, engageable coupling means between the countershaft and tail shaft and selection means having one position providing for a low range of forward operation in which the selection means connects said engageable coupling means between the countershaft and the tail shaft to said tail shaft, a second neutral position and a third position providing for a high range of forward operation in which the selection means connects said additional coupling means to the tail shaft.

4. A hydraulic transmission comprising an input shaft, a tail shaft, a torque converter, a countershaft, coupling means engageable drivably to connect said input shaft to said countershaft through the torque converter, additional coupling means engageable drivably to connect said input shaft to said countershaft, means enabling the countershaft to overrun said coupling means during engagement of said additional coupling means, governing means controlled by the speed of rotation of said countershaft operably connected to said additional coupling means so as to cause said additional coupling means automatically to be engaged with the input shaft at a predetermined speed of said countershaft, engageable coupling means between the countershaft and tail shaft and selection means having one position providing for a low range of forward operation in which the selection means connects said engageable coupling means between the countershaft and the tail shaft to said tail shaft, a second neutral position and a third position providing for a high range of forward operation in which the selection means connects said engageable coupling means between the countershaft and the tail shaft to said tail shaft, a second neutral position and a third position providing for a high range of forward operation in which the selection means connects said additional coupling means to the tail shaft, and additional engageable coupling means between the countershaft and tail shaft, engagement of said additional engageable coupling means with said selection means being in its neutral position acting to provide a third range of forward operation.

5. A hydraulic transmission as in claim 4 in which said additional engageable coupling means between the countershaft and tail shaft has a position providing for said third range of forward operation, a neutral position and a further position providing for a range of reverse operation.

6. A hydraulic transmission comprising an input shaft, a tail shaft, a torque converter including an impeller driven by said input shaft, a runner driven by said impeller, a reaction member mounted on a one way brake for forward movement when said torque converter acts as a fluid coupling, means for absorbing the reaction of said reaction member during torque conversion, a first input pinion, means connecting said runner to the first input pinion, a countershaft, means including a one way clutch drivably connecting said countershaft to said first input pinion, a main shaft, a second input pinion connected to said main shaft and drivably coupled to said countershaft, coupling means adapted to be connected to couple the countershaft to said tail shaft, engageable means having a neutral position, a position in which the engageable means connects the tail shaft to said coupling means, and a position in which the engageable means connects the tail shaft to said second input pinion, a clutch for connecting the input shaft to the main shaft, means controlling the engagement of said clutch, a governor driven by the counter shaft and operably linked with said means controlling the engagement of said clutch so as to engage said clutch at a predetermined speed of said tail shaft and means to change the position of said engageable means so as to vary the range of conversion ratios of the transmission.

7. A hydraulic transmission as in claim 6 in which the means connecting the runner to the first input pinion includes a clutch disengageable to provide together with the disengagement of the first mentioned clutch in a neutral position of the transmission.

8. A hydraulic transmission comprising an input shaft, a tail shaft, a torque converter including an impeller driven by said input shaft, a runner driven by said impeller, a reaction member mounted on a one way brake for forward movement when said torque converter acts as a fluid coupling, means for absorbing the reaction of said reaction member during torque conversion, a first input pinion, means including a first clutch connecting said runner to the first input pinion, a countershaft, means including a one way clutch drivably connecting said countershaft to said first input pinion, a main shaft, a second input pinion connected to said main shaft, and drivably coupled to said countershaft, coupling means adapted to be connected to couple the countershaft to said tail shaft, engageable means having a neutral position, a position in which the engageable means connects the tail shaft to said coupling means and a position in which the engageable means connects the tail shaft to said second input pinion, a second clutch for connecting the input shaft to the main shaft, means for controlling the engagement of said second clutch, a governor driven by the countershaft and operable linked with said means controlling the engagement of said second clutch so as to engage said clutch at a predetermined speed of said tail shaft, gear means acting in one position to drive the tail shaft from the countershaft in a reverse direction, being neutral in a second position and acting in a third position to drive the tail shaft from the countershaft in a forward direction, and means to control the position of said engageable means and of said gear means to provide three ranges of forward operation and a range of reverse operation for the transmission, each of said ranges including a first speed of torque conversion through the converter, a second speed in which the converter acts as a fluid coupling and a third speed in which said second main shaft is connected to the input shaft by said second clutch.

References Cited in the file of this patent

UNITED STATES PATENTS

| | | |
|---|---|---|
| 2,620,684 | McFarland | Dec. 9, 1952 |
| 2,627,189 | McFarland | Feb. 3, 1953 |